United States Patent
Hirashima et al.

(10) Patent No.: US 12,410,502 B2
(45) Date of Patent: Sep. 9, 2025

(54) STEEL SHEET AND PRODUCTION METHOD THEREFOR

(71) Applicant: JFE STEEL CORPORATION, Tokyo (JP)

(72) Inventors: Takuya Hirashima, Tokyo (JP); Tatsuya Nakagaito, Tokyo (JP); Masaki Koba, Tokyo (JP); Kyoko Naito, Tokyo (JP); Seisuke Tsuda, Tokyo (JP); Katsuya Hata, Tokyo (JP); Shotaro Terashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 214 days.

(21) Appl. No.: 18/257,151

(22) PCT Filed: Dec. 15, 2021

(86) PCT No.: PCT/JP2021/046369
§ 371 (c)(1),
(2) Date: Jun. 13, 2023

(87) PCT Pub. No.: WO2022/138396
PCT Pub. Date: Jun. 30, 2022

(65) Prior Publication Data
US 2024/0026481 A1 Jan. 25, 2024

(30) Foreign Application Priority Data
Dec. 24, 2020 (JP) .................................. 2020-215769

(51) Int. Cl.
| | | |
|---|---|---|
| C21D 9/46 | (2006.01) | |
| C21D 1/18 | (2006.01) | |
| C21D 6/00 | (2006.01) | |
| C21D 8/02 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/12 | (2006.01) | |
| C22C 38/14 | (2006.01) | |
| C22C 38/16 | (2006.01) | |
| C22C 38/26 | (2006.01) | |
| C22C 38/38 | (2006.01) | |
| C22C 38/60 | (2006.01) | |
| C23C 2/02 | (2006.01) | |

(52) U.S. Cl.
CPC .............. *C23C 2/024* (2022.08); *C21D 1/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/26* (2013.01); *C22C 38/38* (2013.01); *C22C 38/60* (2013.01); *C23C 2/02* (2013.01); *C23C 2/0224* (2022.08); *C21D 2211/001* (2013.01); *C21D 2211/002* (2013.01); *C21D 2211/005* (2013.01); *C21D 2211/008* (2013.01)

(58) Field of Classification Search
CPC ......... C22C 38/02; C22C 38/04; C22C 38/06; C21D 9/46
See application file for complete search history.

(56) References Cited

U.S. PATENT DOCUMENTS

| | | |
|---|---|---|
| 2016/0186282 A1 | 6/2016 | Han et al. |
| 2019/0161823 A1 | 5/2019 | Kohsaka et al. |
| 2019/0337267 A1 | 11/2019 | Ahn et al. |
| 2020/0232073 A1 | 7/2020 | Yang et al. |
| 2022/0119909 A1 | 4/2022 | Sano et al. |
| 2022/0154302 A1 | 5/2022 | Kawata |

FOREIGN PATENT DOCUMENTS

| | | |
|---|---|---|
| EP | 3653745 A1 | 5/2020 |
| JP | 2010156032 A | 7/2010 |
| JP | 2011168816 A | 9/2011 |
| JP | 2011168876 A | 9/2011 |
| JP | 2012031505 A | 2/2012 |
| WO | 2020208979 A1 | 10/2020 |
| WO | 2020209276 A1 | 10/2020 |

OTHER PUBLICATIONS

Mar. 15, 2022, International Search Report issued in the International Patent Application No. PCT/JP2021/046369.
Jun. 26, 2025, the Extended European Search Report issued by the European Patent Office in the corresponding European Patent Application No. 21910544.2.

*Primary Examiner* — Adam Krupicka
(74) *Attorney, Agent, or Firm* — KENJA IP LAW PC

(57) ABSTRACT

Provided is a steel sheet having excellent workability while ensuring excellent strength. The steel sheet comprises: a predetermined chemical composition; and a steel microstructure that contains ferrite: 45% to 90%, martensite: 5% to 30%, bainite: 1% to 25%, and retained austenite: 3% or more and in which $[Mn]_M/[Mn]$ is 1.00 to 1.15 and $[Mn]_M/[Mn]_F$ is 1.00 to 1.30, wherein TS×El is 16000 MPa·% or more.

8 Claims, No Drawings

STEEL SHEET AND PRODUCTION METHOD THEREFOR

TECHNICAL FIELD

The present disclosure relates to a steel sheet suitably used for automotive members and a production method therefor. The present disclosure more specifically relates to a steel sheet having excellent workability and a production method therefor.

BACKGROUND

As one of the methods for providing automobiles with distinctive appearances, steel sheets for automotive bodies are formed into complex shapes in the automobile industry in recent years. To favorably use steel sheets formed into complex shapes for automotive bodies, the steel sheets are required to have excellent workability without cracking during forming while ensuring certain strength.

In response to such requirement, for example, JP 2012-31505 A (PTL 1) discloses a method of producing a steel sheet having excellent elongation by controlling the heating rate from 660° C. to 730° C., i.e. a temperature range lower than the annealing temperature, and controlling the cooling conditions in a low temperature range after annealing to concentrate carbon into austenite and stabilize retained austenite.

JP 2011-168816 A (PTL 2) discloses a method of producing a steel sheet having excellent elongation by increasing the holding time after annealing cooling to concentrate carbon into austenite and stabilize retained austenite.

CITATION LIST

Patent Literature

PTL 1: JP 2012-31505 A
PTL 2: JP 2011-168816 A

SUMMARY

Technical Problem

As mentioned above, especially steel sheets for automotive bodies are required to be excellent in both strength and workability. In this respect, the techniques disclosed in PTL 1 and PTL 2 have room for further improvement in workability It could therefore be helpful to provide a steel sheet having excellent workability while ensuring excellent strength, and a production method therefor.

Solution to Problem

Upon careful examination, we discovered the following:
(a) In order to achieve favorable workability, it is necessary to increase the elongation (El) as an index of the ductility of steel and decrease the yield ratio (YR=YS/TS) obtained by dividing the yield stress (YS) by the tensile strength (TS).
(b) Utilizing ferrite is effective for achieving excellent elongation, but excessive formation of ferrite significantly degrades the strength. An effective way of enhancing the elongation while maintaining the strength is to utilize retained austenite as well.
(c) A typical method of forming retained austenite is a technique that forms bainite during cooling after annealing or during holding after the cooling and concentrates carbon into austenite. This technique was, however, found to have a problem in that the yield ratio increases due to excessive formation of bainite. As a method of reducing the yield ratio, we looked at controlling the concentration distribution of Mn in steel more uniformly. In detail, the microstructure that is ferrite-austenite dual phase or austenite single phase during annealing holding transforms from austenite into ferrite, martensite, bainite, or other metallic phase during cooling after the annealing or during holding after the cooling, with the untransformed phase being retained austenite. There is a tendency that, during the cooling or during the holding after the cooling, Mn migrates from ferrite present since the annealing holding and ferrite formed as a result of the transformation to austenite, and eventually Mn concentrates into martensite that is derived from the austenite. Here, by optimizing the annealing conditions and suppressing the concentration of Mn into austenite beforehand, the concentration of Mn into martensite can be suppressed while preferentially forming ferrite over bainite, so that the Mn concentration in martensite can be relatively reduced. Thus, an effective way of reducing the yield ratio and achieving excellent strength and workability is to reduce the Mn concentration in martensite to a predetermined range while suppressing excessive formation of bainite.
(d) Annealing conditions that can reduce the Mn concentration in martensite to the predetermined range involve performing annealing more rapidly than in conventional techniques, specifically, increasing the heating rate in a high temperature range up to the annealing temperature and controlling the soaking time during the annealing (annealing holding time) to be short.

The present disclosure is based on these discoveries and further studies. We thus provide:

1. A steel sheet comprising: a chemical composition containing (consisting of), in mass %, C: 0.08% or more and 0.16% or less, Si: 0.5% or more and 1.5% or less, Mn: 1.7% or more and 2.5% or less, P: 0.10% or less, S: 0.050% or less, Al: 0.01% or more and 0.20% or less, and N: 0.10% or less, with a balance consisting of Fe and inevitable impurities; and a steel microstructure in which, in area ratio to the entire steel microstructure, ferrite is 45% or more and 90% or less, martensite is 5% or more and 30% or less, bainite is 1% or more and 25% or less, retained austenite is 3% or more, and other metallic phase is 5% or less, wherein $[Mn]_M/[Mn]$ is 1.00 or more and 1.15 or less, and $[Mn]_M/[Mn]_F$ is 1.00 or more and 1.30 or less, where $[Mn]$ is an average Mn concentration in steel, $[Mn]_M$ is an average Mn concentration in the martensite, and $[Mn]_F$ is an average Mn concentration in the ferrite, and a product of tensile strength and elongation (TS×El) is 16000 MPa·% or more.

In the present disclosure, the "average Mn concentration in steel ($[Mn]$)" refers to the Mn content in the chemical composition. Accordingly, $[Mn]$ in the present disclosure is 1.7 mass % or more and 2.5 mass % or less. The average Mn concentration in martensite ($[Mn]_M$)", the "average Mn concentration in ferrite ($[Mn]_F$)", the "tensile strength (TS)", and the "elongation (El)" in the present disclosure can be measured by the below-described respective methods.

2. The steel sheet according to 1., wherein the chemical composition further contains, in mass %, one or more selected from the group consisting of Nb: 0.040% or less, Ti:

0.030% or less, B: 0.0030% or less, Cr: 0.3% or less, Mo: 0.2% or less, and V: 0.065% or less.

3. The steel sheet according to 1. or 2., wherein the chemical composition further contains, in mass %, one or more selected from the group consisting of Ta, W, Ni, Cu, Sn, Sb, Ca, Mg, and Zr: 0.1% or less in total.

4. The steel sheet according to any one of 1. to 3., wherein a yield ratio (YR) calculated as a ratio of yield stress to the tensile strength (YS/TS) is 0.80 or less.

The "yield stress (YS)" can be measured by the below-described method.

5. The steel sheet according to any one of 1. to 4., further comprising a coated or plated layer on at least one side thereof.

6. A production method for a steel sheet, the production method comprising: a hot rolling process in which a steel slab having the chemical composition according to any one of 1. to 3. is heated at a slab heating temperature of 1200° C. or more, rolled at a rolling finish temperature of 840° C. or more and 900° C. or less, and thereafter cooled to a coiling temperature of 450° C. or more and 650° C. or less and coiled to obtain a hot-rolled sheet; a cold rolling process in which the hot-rolled sheet is cold rolled to obtain a cold-rolled sheet; and an annealing process in which the cold-rolled sheet is annealed to obtain a steel sheet, wherein in the annealing process, the cold-rolled sheet is subjected to: heating at an average heating rate of 1° C./sec or more and 7° C./sec or less in a temperature range from 600° C. to an annealing temperature; after the heating, annealing at the annealing temperature of ($A_{c1}$ point +50° C.) or more and ($A_{c3}$ point +20° C.) or less for an annealing holding time of 1 sec or more and less than 35 sec; after the annealing, primary cooling at an average cooling rate of 10° C./sec or more and 50° C./sec or less in a temperature range from the annealing temperature to a primary cooling stop temperature of 450° C. or more and 600° C. or less; and after the primary cooling, secondary cooling for a retention time of 20 sec or more and 100 sec or less from the primary cooling stop temperature to a secondary cooling stop temperature of 400° C. or more and 500° C. or less.

7. The production method for a steel sheet according to 6., further comprising a coating or plating process in which a coating or plating treatment is performed on at least one side of the steel sheet, after the secondary cooling in the annealing process.

Advantageous Effect

It is thus possible to provide a steel sheet having excellent workability while ensuring excellent strength. The use of the steel sheet in automotive members such as automotive bodies allows the automotive members to have various shapes while ensuring excellent strength, so that the performance of automobiles can be enhanced. It is also possible to provide a production method that can produce a steel sheet having excellent workability while ensuring excellent strength.

DETAILED DESCRIPTION

An embodiment of the present disclosure will be described in detail below.

The following embodiment shows a preferred example of the present disclosure, and does not limit the present disclosure.

(Steel Sheet)

A steel sheet according to the present disclosure comprises a predetermined chemical composition and a microstructure containing ferrite, martensite, bainite, and retained austenite at predetermined area ratios, wherein the Mn concentration in the martensite is limited to less than or equal to a predetermined concentration, and TS×El is high. The steel sheet according to the present disclosure having such features has excellent workability while ensuring strength.

The steel sheet according to the present disclosure can be suitably obtained, for example, by a production method according to the present disclosure.

The steel sheet according to the present disclosure can be suitably used in applications requiring strength and workability, such as automotive members.

[Chemical Composition]

First, the chemical composition of the steel sheet according to the present disclosure will be described below. In the following description of the chemical composition, "%", which is the unit of the content of each element, denotes "mass %".

C: 0.08% or More and 0.16% or Less

C is an element that improves the hardenability of the steel, and is necessary to ensure the desired strength. In the present disclosure, the C content needs to be 0.08% or more, from the viewpoint of increasing the strength of ferrite by C and ensuring tensile strength TS≥750 MPa. If the C content is less than 0.08%, the desired strength cannot be achieved. The C content is preferably 0.09% or more, and more preferably 0.10% or more. If the C content is more than 0.16%, not only bainite forms easily, but also the yield stress YS increases relative to the tensile strength TS in ferrite, so that the yield ratio YR increases. The C content is therefore 0.16% or less. The C content is preferably 0.15% or less, and more preferably 0.14% or less.

Si: 0.5% or More and 1.5% or Less

Si not only is a solid-solution-strengthening element but also has the effect of suppressing the formation of bainite. To achieve these effects, the Si content needs to be 0.5% or more, and is preferably 0.6% or more, and more preferably 0.7% or more. Si is also an element that degrades the surface properties. Moreover, Si increases the yield stress YS relative to the tensile strength TS in ferrite, thus increasing the yield ratio YR. The Si content is therefore 1.5% or less, preferably 1.4% or less, and more preferably 1.2% or less.

Mn: 1.7% or More and 2.5% or Less

Mn is added in order to improve the hardenability of the steel and ensure the desired strength. If the Mn content is less than 1.7%, the desired strength cannot be achieved. The Mn content is therefore 1.7% or more, preferably 1.8% or more, and more preferably 1.9% or more. If the Mn content is excessively high, oxides form on the surface of the steel sheet, which significantly degrades the surface properties. Moreover, the concentration of Mn into austenite is promoted, so that not ferrite but bainite forms during cooling after annealing or during holding after the cooling, causing an increase in yield ratio YR. The Mn content is therefore 2.5% or less, preferably 2.4% or less, and more preferably 2.3% or less.

P: 0.10% or Less

P is an element that strengthens the steel. If the P content is high, however, P segregates to grain boundaries and degrades the elongation. The P content is therefore 0.10% or less, preferably 0.05% or less, and more preferably 0.03% or less. Although no lower limit is placed on the P content, the lower limit currently industrially practicable is about 0.001%. The P content is therefore preferably 0.001%, more preferably 0.003% or more, and further preferably 0.005% or more.

S: 0.050% or Less

S degrades the elongation through the formation of MnS and the like. In addition, in the case where Ti is contained together with S, the elongation is likely to degrade through the formation of TiS, Ti(C, S), and the like. The S content is therefore 0.050% or less, preferably 0.030% or less, more preferably 0.020% or less, and further preferably 0.010% or less. Although no lower limit is placed on the S content, the lower limit currently industrially practicable is about 0.0002%. The S content is therefore preferably 0.0002% or more. The S content is more preferably 0.0005% or more.

Al: 0.01% or More and 0.20% or Less

Al is added in order to perform sufficient deoxidation, reduce coarse inclusions in the steel, and improve the elongation. These effects cannot be achieved if the Al content is less than 0.01%. The Al content is therefore 0.01% or more, and preferably 0.02% or more. If the Al content is more than 0.20%, coarse nitride-based precipitates such as AlN form, causing a decrease in elongation. The Al content is therefore 0.20% or less, preferably 0.17% or less, and more preferably 0.15% or less.

N: 0.10% or Less

N is an element that forms nitride-based precipitates such as AlN that can pin grain boundaries, and is added in order to improve the elongation. If the N content is more than 0.10%, coarse nitride-based precipitates such as AlN form, causing a decrease in elongation. The N content is therefore 0.10% or less, preferably 0.05% or less, and more preferably 0.01% or less. Although no lower limit is placed on the N content, the lower limit currently industrially practicable is about 0.0006%. The N content is therefore preferably 0.0006% or more, and more preferably 0.0010% or more.

The steel sheet according to the present disclosure has a chemical composition containing the foregoing elements and the balance containing Fe (iron) and inevitable impurities. In particular, a steel sheet according to an embodiment of the present disclosure preferably has a chemical composition containing the foregoing elements with the balance consisting of Fe and inevitable impurities.

The steel sheet according to an embodiment of the present disclosure may further contain one or more selected from the group consisting of Nb: 0.040% or less,
Ti: 0.030% or less,
B: 0.0030% or less,
Cr: 0.3% or less,
Mo: 0.2% or less, and
V: 0.065% or less,
as optionally added elements.

The steel sheet according to an embodiment of the present disclosure may further contain one or more selected from the group consisting of Ta, W, Ni, Cu, Sn, Sb, Ca, Mg, and Zr in a total amount of 0.1% or less, as optionally added elements. In the present disclosure, in the case where any of these optionally added elements is contained in an amount below its preferred lower limit described below, the element is contained as an inevitable impurity.

Nb: 0.040% or Less

Nb contributes to higher strength through the refinement of prior γ grains and the formation of fine precipitates. To achieve this effect, in the case of positively containing Nb, the Nb content is preferably 0.001% or more, more preferably 0.0015% or more, and further preferably 0.0020% or more. If the Nb content is high, the amount of carbonitride-based precipitates is excessive, so that the elongation decreases. Moreover, the increase of the amount of carbonitride-based precipitates causes the yield stress YS to increase relative to the tensile strength TS in ferrite, as a result of which the yield ratio YR increases. Accordingly, in the case of containing Nb, the Nb content is preferably 0.040% or less, more preferably 0.035% or less, and further preferably 0.030% or less.

Ti: 0.030% or Less

Ti contributes to higher strength through the refinement of prior γ grains and the formation of fine precipitates, as with Nb. To achieve this effect, in the case of positively containing Ti, the Ti content is preferably 0.001% or more, more preferably 0.0015% or more, and further preferably 0.0020% or more. If the Ti content is high, the amount of carbonitride-based precipitates is excessive, so that the elongation decreases. Moreover, the increase of the amount of carbonitride-based precipitates causes the yield stress YS to increase relative to the tensile strength TS in ferrite, as a result of which the yield ratio YR increases. Accordingly, in the case of containing Ti, the Ti content is preferably 0.030% or less, more preferably 0.025% or less, and further preferably 0.020% or less.

B: 0.0030% or Less

B is an element that improves the hardenability of the steel. As a result of containing B, the desired strength can be easily achieved even in the case where the Mn content is low. To achieve this effect, in the case of positively containing B, the B content is preferably 0.0001% or more, and more preferably 0.0002% or more. If the B content is more than 0.0030%, the amount of nitride-based precipitates such as BN is excessive, so that the elongation decreases. The B content is therefore preferably 0.0030% or less, more preferably 0.0025% or less, and further preferably 0.0020% or less.

Cr: 0.3% or Less

Cr may be contained for the purpose of achieving the effect of improving the hardenability of the steel. Although no lower limit is placed on the Cr content, the Cr content is preferably 0.005% or more from the viewpoint of achieving the foregoing effect. If the Cr content is excessively high, the amount of precipitates such as carbides is excessive, so that the elongation decreases. In addition, in the case of further performing a coating or plating treatment on the steel sheet surface, an oxide formation reaction accompanied by the generation of hydrogen ions may occur. This is likely to hinder an increase in the pH of the steel substrate surface and hinder the precipitation of zinc phosphate crystals, causing poor chemical conversion and degrading the surface properties of the coated or plated layer. Accordingly, in the case of containing Cr, the Cr content is preferably 0.3% or less, more preferably 0.2% or less, and further preferably 0.1% or less.

Mo: 0.2% or Less

Mo may be contained for the purpose of achieving the effect of improving the hardenability of the steel, as with Cr. Although no lower limit is placed on the Mo content, the Mo content is preferably 0.005% or more from the viewpoint of achieving the foregoing effect. If the Mo content is excessively high, the amount of precipitates such as carbides is excessive, so that the elongation decreases. In addition, in the case of further performing a coating or plating treatment on the steel sheet surface, there is a possibility that the surface properties of the coated or plated layer degrade due to the same mechanism as in the case of Cr. Accordingly, in the case of containing Mo, the Mo content is preferably 0.2% or less, more preferably 0.1% or less, and further preferably 0.04% or less.

V: 0.065% or Less

V may be contained for the purpose of achieving the effect of improving the hardenability of the steel, as with Cr and Mo. Although no lower limit is placed on the V content, the V content is preferably 0.005% or more from the viewpoint of achieving the foregoing effect. If the V content is excessively high, the amount of precipitates such as carbides is excessive, so that the elongation decreases. In addition, in the case of further performing a coating or plating treatment on the steel sheet surface, there is a possibility that the surface properties of the coated or plated layer degrade due to the same mechanism as in the case of Cr and Mo. Accordingly, in the case of containing V, the V content is preferably 0.065% or less, more preferably 0.050% or less, and further preferably 0.035% or less.

One or More Selected from the Group Consisting of Ta, W, Ni, Cu, Sn, Sb, Ca, Mg, and Zr: 0.1% or Less in Total Ta, W, Ni, Cu, Sn, Sb, Ca, Mg, and Zr are each an element that increases the strength without degrading the coating quality. To achieve this effect, the content of each of these elements or the total content of these elements is preferably 0.0010% or more. If the total content of these elements is more than 0.1%, the effect is saturated. Accordingly, in the case of containing one or more selected from the group consisting of Ta, W, Ni, Cu, Sn, Sb, Ca, Mg, and Zr, the total content of these elements is preferably 0.1% or less.

[Microstructure]

The microstructure of the steel sheet according to the present disclosure will be described below.

The microstructure of the steel sheet according to the present disclosure contains, in area ratio, ferrite: 45% or more and 90% or less, martensite: 5% or more and 30% or less, bainite: 1% or more and 25% or less, and retained austenite: 3% or more. In the microstructure of the steel sheet according to the present disclosure, $[Mn]_M/[Mn]$ is 1.00 or more and 1.15 or less, and $[Mn]_M/[Mn]_F$ is 1.00 or more and 1.30 or less, where [Mn] is the average Mn concentration in steel, $[Mn]_M$ is the average Mn concentration in martensite, and $[Mn]_F$ is the average Mn concentration in ferrite.

Herein, the "area ratio" refers to the ratio of the area of each metallic phase to the area of the entire steel microstructure.

Area ratio of ferrite: 45% or more and 90% or less Ferrite is a necessary microstructure from the viewpoint of improving the elongation of the steel sheet and improving the workability. The area ratio of ferrite therefore needs to be 45% or more, and is preferably 50% or more, and more preferably 55% or more. That is, microstructure in which the area ratio of ferrite is highest, i.e. microstructure having ferrite as main phase, is more preferable. If the area ratio of ferrite is excessively high, the area ratio of martensite for ensuring the strength decreases, making it difficult to ensure the desired strength of the steel sheet. The area ratio of ferrite is therefore 90% or less, preferably 85% or less, and more preferably 80% or less.

In this specification, ferrite is a microstructure composed of crystal grains of a BCC lattice, and is usually formed as a result of transformation from austenite at a relatively high temperature.

Area Ratio of Martensite: 5% or More and 30% or Less

Martensite contributes to higher strength, and thus is a necessary microstructure for ensuring the adequate strength. The area ratio of martensite therefore needs to be 5% or more, and is preferably 8% or more, and more preferably 10% or more. An increase in the area ratio of martensite, however, causes a decrease in elongation. The area ratio of martensite is therefore 30% or less, preferably 28% or less, and more preferably 25% or less.

In this specification, martensite is a hard microstructure formed as a result of transformation from austenite at the martensite transformation point (also simply referred to as "Ms point") or less, and includes both fresh martensite as quenched and tempered martensite obtained by reheating and tempering fresh martensite.

Area Ratio of Bainite: 1% or More and 25% or Less

Bainite causes an increase in yield ratio, and accordingly the area ratio of bainite needs to be low. The area ratio of bainite is therefore 25% or less, preferably 20% or less, and more preferably 15% or less. Since not a little bainite is generated when forming ferrite during cooling after annealing or during holding after the cooling, the lower limit of the area ratio of bainite is 1%. In the conventional techniques, Mn tends to concentrate into austenite in a high temperature range, as a result of which a relatively large amount of bainite tends to form since cooling after annealing. In the present disclosure, by optimizing the annealing conditions as described later, the bainite ratio can be reduced while maintaining the retained austenite ratio, with it being possible to achieve excellent workability.

In this specification, bainite is a hard microstructure in which fine carbides are dispersed in acicular or platelike ferrite, and is formed as a result of transformation from austenite at a relatively low temperature higher than or equal to the Ms point.

Area Ratio of Retained Austenite: 3% or More

Retained austenite is a necessary microstructure to achieve favorable elongation. The area ratio of retained austenite is therefore 3% or more, preferably 5% or more, and more preferably 7% or more. No upper limit is placed on the area ratio of retained austenite, and the area ratio of retained austenite is desirably high from the viewpoint of achieving favorable elongation. Typically, the area ratio of retained austenite is preferably 20% or less. The area ratio of retained austenite is more preferably 15% or less and further preferably 10% or less, from the viewpoint of promoting the formation of ferrite while suppressing the formation of bainite in order to reduce the yield ratio.

In this specification, retained austenite is austenite remaining as a result of austenite not transforming into ferrite, martensite, bainite, or any other metallic phase.

Area Ratio of Other Metallic Phases: 5% or Less

The microstructure of the steel sheet according to the present disclosure may further contain other metallic phases besides the foregoing ferrite, martensite, bainite, and retained austenite. An allowable area ratio of other metallic phases is 5% or less. The area ratio of other metallic phases is preferably 1% or less. The area ratio of other metallic phases may be 0%.

The other metallic phases include, for example, pearlite. In this specification, pearlite is a microstructure composed of ferrite and acicular cementite.

The area ratio of each phase can be measured in the following manner.

For ferrite, martensite, and bainite, a test piece is collected from the steel substrate region of the steel sheet (in the case where the steel sheet has the below-described coated or plated layer, the region except the coated or plated layer) so that an L section parallel to the rolling direction will be the test surface. The test surface of the test piece is then mirror-polished, and the microstructure is revealed with a nital solution. The test surface of the test piece on which the microstructure has been revealed is observed using a scanning electron microscope (SEM) with 1500 magnification to obtain an SEM image, and the area ratio of each of ferrite, martensite, and bainite at a position of ¼ of the thickness is measured by a point counting method.

In the SEM image, martensite exhibits white microstructure. In tempered martensite out of martensite, fine carbides precipitate inside. Ferrite exhibits black microstructure. In bainite, white carbides precipitate in black microstructure. Based on these criteria, each phase is identified from the SEM image. Here, it may be difficult to reveal internal carbides depending on the plane orientation of the block grains and the degree of etching. In such a case, etching is sufficiently performed to confirm if the internal carbides are present.

The area ratio of retained austenite can be measured in the following manner.

After performing polishing from the surface of the steel sheet as the steel substrate to a position of ¼ of the thickness, chemical polishing is further performed by 0.1 mm. For the resultant surface, the integrated reflection intensity of each of (200) plane, (220) plane, and (311) plane of FCC iron (austenite) and (200) plane, (211) plane, and (220) plane of BCC iron (ferrite) is measured using a Kα ray of Mo in an X-ray diffractometer. The ratio of austenite calculated from the intensity ratio of the integrated reflection intensity from each plane of FCC iron (austenite) to the integrated reflection intensity from each plane of BCC iron (ferrite) is taken to be the area ratio of retained austenite.

The area ratio of other metallic phases can be calculated by subtracting the measured area ratios of ferrite, martensite, bainite, and retained austenite from 100%.

$[Mn]_M/[Mn]$: 1.00 or More and 1.15 or Less

A high average Mn concentration in martensite ($[Mn]_M$) relative to the average Mn concentration in steel ($[Mn]$) means a high concentration distribution of Mn in the steel sheet as the finished product. Typically, Mn tends to concentrate into martensite eventually, as mentioned above. The high concentration distribution of Mn as a result of Mn concentrating into martensite indicates that, upon transformation from austenite to martensite, the amount of transformation expansion of martensite is large and consequently strain is introduced into ferrite. This causes an increase in yield ratio. From the viewpoint of decreasing the yield ratio and enhancing the workability, it is very important to reduce the concentration distribution of Mn in the steel sheet (i.e. reduce $[Mn]_M/[Mn]$).

The Mn concentration in austenite in the microstructure during annealing holding is one of the factors that determine whether the phase transformed from austenite during cooling after annealing or holding after the cooling is ferrite or bainite. Moreover, the Mn concentration in austenite in the microstructure during annealing holding has certain correlation with the Mn concentration in martensite in the steel sheet as the finished product. For example, when $[Mn]_M/[Mn]$ is lower, i.e. when concentration of Mn into austenite in the microstructure during annealing holding is suppressed more, ferrite transformation since cooling after annealing is facilitated. When $[Mn]_M/[Mn]$ is higher, i.e. when concentration of Mn into austenite in the microstructure during annealing holding is promoted more, bainite transformation since cooling after annealing is facilitated, which causes an increase in yield ratio. If $[Mn]_M$ is more than 1.15 times $[Mn]$, the concentration distribution of Mn is high, and also bainite transformation is significantly facilitated. $[Mn]_M/$ [Mn] therefore needs to be 1.15 or less, and is preferably 1.13 or less, and more preferably 1.10 or less.

Since Mn is discharged from ferrite and concentrates into austenite, the lower limit of $[Mn]_M/[Mn]$ is 1.00.

$[Mn]_M/[Mn]_F$: 1.00 or More and 1.30 or Less

The ratio of the average Mn concentration in martensite ($[Mn]_M$) and the average Mn concentration in ferrite ($[Mn]_F$) is one of the factors that determine the yield ratio. Typically, Mn tends to concentrate into martensite eventually, as mentioned above. The high concentration distribution of Mn as a result of Mn concentrating into martensite indicates that, upon transformation from austenite to martensite, the amount of transformation expansion of martensite is large and consequently strain is introduced into ferrite. This causes an increase in yield ratio. To achieve a low yield ratio, it is very important to reduce $[Mn]_M/[Mn]_F$. $[Mn]_M/[Mn]_F$ therefore needs to be 1.30 or less, and is preferably 1.25 or less, and more preferably 1.20 or less.

Since Mn is discharged from ferrite and concentrates into austenite, the lower limit of $[Mn]_M/[Mn]_F$ is 1.00.

$[Mn]_M$ and $[Mn]_F$ in the steel microstructure can be measured in the following manner.

A distribution image of 20 μm in the rolling direction of the sample and 20 μm in the thickness direction of the sample is measured in a grid form with measurement intervals of 0.1 μm using EPMA at a position of ¼ of the thickness in the thickness direction from either surface of the steel substrate region of the steel sheet, and the Mn concentration at each measurement point is measured. A SEM image at the same position as the distribution image is obtained, too. The obtained distribution image and SEM image are compared, and the average value of the Mn concentrations at all measurement points in martensite and the average value of the Mn concentrations at all measurement points in ferrite are respectively taken to be $[Mn]_M$ and $[Mn]_F$ (unit: mass %).

Herein, [Mn] is the Mn content (unit: mass % concentration) in the chemical composition of the steel sheet.

[Mechanical Properties]

(TS×El): 16000 MPa·% or More

In the steel sheet according to the present disclosure, the product TS× El of the tensile strength TS (MPa) and the elongation El (%) needs to be 16000 MPa·% or more. The steel sheet according to the present disclosure is required to exhibit excellent workability by increasing the elongation without decreasing the strength. If TS×El is less than 16000 MPa·%, at least one of the tensile strength TS and the elongation El is poor. TS×El is preferably 16500 MPa·% or more, and more preferably 17000 MPa·% or more. Excessively increasing TS causes a decrease in the amount of ferrite, as a result of which El decreases more than the increase of TS. Excessively increasing El causes a decrease in TS, making it impossible to achieve the desired TS. Accordingly, TS×El is preferably 18000 MPa·% or less.

YR

In the steel sheet according to the present disclosure, the yield ratio YR=YS/TS, which is calculated as the ratio of the yield stress YS(MPa) to the tensile strength TS (MPa), is preferably 0.80 or less, more preferably 0.75 or less, and further preferably 0.70 or less. For example, a low yield ratio means excellent workability without fracture even when the steel sheet is formed into a complex shape. The yield ratio YR may be 0.50 or more, from the viewpoint of achieving the minimum required collision resistance for suitable use in automobiles.

TS

In the steel sheet according to the present disclosure, the tensile strength TS is preferably 750 MPa or more and more preferably 780 MPa or more, from the viewpoint of exhibiting the desired strength. No upper limit is placed on the tensile strength, but the tensile strength is preferably less than 980 MPa from the viewpoint of balancing with other properties such as the elongation El.

The tensile strength TS, the yield stress YS, and the elongation El can be measured in the following manner.

A JIS No. 5 test piece with a gauge length of 50 mm and a gauge width of 25 mm is collected from the sheet transverse center of the steel substrate region of the steel sheet so that the rolling direction will be the longitudinal direction. Using the collected JIS No. 5 test piece, a tensile test is conducted in accordance with JIS Z 2241 (2011) to measure TS, YS, and El. The tensile rate is 10 mm/min.

[Coated or Plated Layer]

The steel sheet according to an embodiment of the present disclosure may further include a coated or plated layer on at least one side (surface), from the viewpoint of imparting desired properties such as rust prevention and corrosion prevention to the steel sheet. The steel sheet may include the coated or plated layer on both sides. Examples of the coated or plated layer include a Zn-based coated or plated layer and an Al-based coated or plated layer. The method of forming the coated or plated layer may be a known method such as a dry method or a wet method. A wet method such as hot-dip coating or electroplating is preferable from the viewpoint of coating or plating a large area efficiently at low cost. Hot-dip coating is more preferable and hot-dip galvanizing is further preferable, from the viewpoint of facilitating adjustment of various coating or plating properties such as coating weight and components in the coated or plated layer.

(Production Method for Steel Sheet)

A production method for a steel sheet according to the present disclosure will be described below.

The production method according to the present disclosure includes a hot rolling process, a cold rolling process, an annealing process, and optionally one or more other processes according to predetermined conditions, using a steel slab having a predetermined chemical composition, wherein the annealing process is performed rapidly. By rapidly performing the annealing process according to predetermined conditions in the production method according to the present disclosure, the Mn concentration in martensite can be reduced while suppressing excessive formation of bainite. The steel sheet thus obtained has excellent strength and workability.

The production method according to the present disclosure can be suitably used, for example, to obtain the steel sheet according to the present disclosure. The production method according to the present disclosure can be suitably used for the purpose of obtaining steel sheets required to have strength and workability, such as automotive members.

In the following description, the temperature is the surface temperature of the steel sheet (steel substrate) unless otherwise specified. The surface temperature of the steel sheet can be measured, for example, using a radiation thermometer.

[Hot Rolling Process]

In the hot rolling process, a steel slab having the foregoing chemical composition is heated at a slab heating temperature of 1200° C. or more, rolled at a rolling finish temperature of 840° C. or more and 900° C. or less, and then cooled to a coiling temperature of 450° C. or more and 650° C. or less and coiled to obtain a hot-rolled sheet. The method of preparing the steel slab is not limited, and the steel slab can be prepared by ingot casting, thin slab casting, or continuous casting. Of these, continuous casting is preferable from the viewpoint of preventing macro-segregation of the constituent elements.

Slab Heating Temperature: 1200° C. or More

If the slab heating temperature is less than 1200° C., precipitates such as AlN do not dissolve, and, during hot rolling, coarsen and degrade the elongation. Therefore, the slab heating temperature is 1200° C. or more, preferably 1230° C. or more, and more preferably 1250° C. or more. No upper limit is placed on the slab heating temperature, but the slab heating temperature is preferably 1400° C. or less and more preferably 1350° C. or less from the viewpoint of the production costs.

Rolling Finish Temperature: 840° C. or More and 900° C. or Less

If the rolling finish temperature is less than 840° C., it takes time to lower the temperature until it reaches the rolling finish temperature, and inclusions and coarse carbides form, causing degradation in elongation. In addition, the quality of the inside of the steel sheet may decrease. The rolling finish temperature is therefore 840° C. or more, and preferably 860° C. or more. If the holding time at high temperature during rolling is long, coarse inclusions form, causing degradation in elongation. The rolling finish temperature is therefore 900° C. or less, and preferably 880° C. or less.

Coiling Temperature: 450° C. or More and 650° C. or Less

If the coiling temperature is more than 650° C., the surface of the steel sheet, which belongs to the steel substrate, may decarburize. This causes a difference in microstructure between the inside and the surface of the steel sheet, which is likely to result in uneven alloy concentration. Besides, coarse carbides and nitrides form, causing degradation in elongation. The coiling temperature is therefore 650° C. or less, and preferably 630° C. or less. The coiling temperature is 450° C. or more and preferably 470° C. or more, in order to prevent a decrease in cold rolling manufacturability in the next process.

The hot-rolled sheet after the coiling may be pickled. The pickling conditions are not limited, and may be in accordance with conventional methods. The hot-rolled sheet after the coiling may be subjected to a heat treatment for softening the microstructure.

[Cold Rolling Process]

In the cold rolling process, the hot-rolled sheet obtained in the hot rolling process is cold rolled to obtain a cold-rolled sheet. Since the purpose of the cold rolling process is to control the thickness to the target thickness, the rolling conditions are not limited as long as the desired thickness can be obtained. If the cold rolling ratio is low, recrystallization is less likely to occur in the next annealing process, and the elongation may decrease due to formation of non-recrystallized ferrite. The cold rolling ratio is therefore preferably 20% or more, and more preferably 30% or more. If the cold rolling ratio is high, recrystallization is less likely to occur in the next annealing process because of excessive application of strain, and the elongation may decrease due to formation of non-recrystallized ferrite. The cold rolling ratio is therefore preferably 90% or less, and more preferably 80% or less.

[Annealing Process]

In the annealing process, the cold-rolled sheet obtained in the cold rolling process is annealed to obtain a steel sheet. In the present disclosure, it is very important to control the annealing conditions as follows: The cold-rolled sheet is subjected to: heating at an average heating rate of 1° C./sec or more and 7° C./sec or less in a temperature range from 600° C. to an annealing temperature; after the heating, annealing at the annealing temperature of ($A_{c1}$ point +50° C.) or more and ($A_{c3}$ point +20° C.) or less for an annealing holding time of 1 sec or more and less than 35 sec; after the annealing, primary cooling at an average cooling rate of 10° C./sec or more and 50° C./sec or less in a temperature range from the annealing temperature to a primary cooling stop temperature of 450° C. or more and 600° C. or less; and after the primary cooling, secondary cooling for a retention time of 20 sec or more and 100 sec or less from the primary cooling stop temperature to a secondary cooling stop temperature of 400° C. or more and 500° C. or less. Unless the annealing conditions are controlled in this way, the microstructure area ratio and the Mn concentration distribution of the obtained steel sheet cannot be limited to the predetermined ranges. That is, a steel sheet having excellent strength and workability cannot be obtained.

Average Heating Rate from 600° C. to Annealing Temperature: 1° C./Sec to 7° C./Sec Increasing the heating rate in the annealing process is one of the main features of the present disclosure. In particular, if the heating rate in the high temperature range from 600° C. to the annealing temperature is excessively low, Mn, which has a low diffusion rate, concentrates into austenite. In the case where the Mn concentration in austenite is high, in the subsequent transformation process, not only bainite transformation is promoted, but also Mn concentrates into martensite and as a result the Mn concentration distribution increases. This causes an increase in yield ratio, and consequently degradation in workability. Therefore, the average heating rate in the temperature range from 600° C. to the annealing temperature is 1° C./sec or more, preferably 2° C./sec or more, and more preferably 3° C./sec or more. Meanwhile, a lower heating rate is better from the viewpoint of recrystallizing ferrite to secure the area ratio of ferrite and from the viewpoint of concentrating carbon into austenite to eventually form retained austenite. The average heating rate in the temperature range from 600° C. to the annealing temperature is therefore 7° C./sec or less, preferably 6° C./sec or less, and more preferably 5° C./sec or less.

Annealing Temperature: ($A_{c1}$ Point +50° C.) to ($A_{c3}$ Point +20° C.)

If the annealing temperature is less than ($A_{c1}$ point +50° C.), coarse Fe-based precipitates form, as a result of which the strength and the elongation decrease. The annealing temperature is therefore ($A_{c1}$ point +50° C.) or more, and preferably ($A_{c1}$ point +60° C.) or more. If the annealing temperature is more than ($A_{c3}$ point +20° C.), the area ratio of ferrite phase decreases, and the elongation decreases. The annealing temperature is therefore ($A_{c3}$ point +20° C.) or less, and preferably ($A_{c3}$ point +10° C.) or less.

In this specification, the $A_{c1}$ point and the $A_{c3}$ point are calculated according to the following formulas (1) and (2) respectively:

$$A_{c1}=723+22(\% \text{ Si})-18(\% \text{ Mn})+17(\% \text{ Cr})+4.5(\% \text{ Mo})+16(\% \text{ V}) \quad (1)$$

$$A_{c3}=910-203\sqrt{(\% \text{ C})}+45(\% \text{ Si})-30(\% \text{ Mn})-20(\% \text{ Cu})-15(\% \text{ Ni})+11(\% \text{ Cr})+32(\% \text{ Mo})+104(\% \text{ V})+400(\% \text{ Ti})+460(\% \text{ Al}) \quad (2),$$

where "(% element symbol)" denotes the content (mass %) of the corresponding element in the chemical composition, and is 0 in the case where the element is not contained.

Annealing Holding Time: 1 Sec or More and Less than 35 Sec

Controlling the holding time at the annealing temperature (annealing holding time) to be short is also one of the main features of the present disclosure. The annealing holding time is an important factor for controlling the Mn concentration in austenite before transformation and in ferrite after transformation. A shorter annealing holding time is better from the viewpoint of suppressing concentration of Mn into austenite and also suppressing concentration of Mn from ferrite into martensite during the transformation process to reduce the yield ratio. The annealing holding time is therefore less than 35 sec, preferably 30 sec or less, more preferably 25 sec or less, and further preferably 20 sec or less. If the annealing holding time is less than 1 sec, coarse Fe-based precipitates do not dissolve, so that the elongation decreases. The annealing holding time is therefore 1 sec or more, and preferably 5 sec or more.

Average Cooling Rate from Annealing Temperature to Primary Cooling Stop Temperature: 10° C./Sec to 50° C./Sec In the primary cooling process following the annealing at the annealing temperature, the cooling rate needs to be controlled in order to form ferrite. If the cooling rate in the primary cooling is low, not only ferrite but also pearlite forms, causing poor elongation. Hence, accelerated cooling needs to be performed in order to suppress the formation of pearlite. The average cooling rate in the temperature range from the annealing temperature to the primary cooling stop temperature (average primary cooling rate) is therefore 10° C./sec or more, preferably 12° C./sec or more, and more preferably 15° C./sec or more. If the cooling rate is excessively high, ferrite does not form, and bainite forms in the subsequent secondary cooling, causing an increase in yield ratio. The average primary cooling rate is therefore 50° C./sec or less, preferably 45° C./sec or less, and more preferably 40° C./sec or less.

Primary Cooling Stop Temperature: 450° C. or More and 600° C. or Less

The temperature range of 600° C. or more is the temperature range in which ferrite and pearlite form. Accordingly, if the primary cooling stop temperature is more than 600° C., due to excessive formation of ferrite or formation of pearlite in the following secondary cooling, TS×El decreases and the workability degrades. The primary cooling stop temperature is therefore 600° C. or less, and preferably 550° C. or less. The temperature range of less than 450° C. is the temperature range in which bainite forms. Accordingly, if the primary cooling stop temperature is less than 450° C., the retention temperature in the following secondary cooling is excessively low, and bainite forms excessively. The primary cooling stop temperature is therefore 450° C. or more, and preferably 480° C. or more.

Retention Time from Primary Cooling Stop Temperature to Secondary Cooling Stop Temperature: 20 Sec to 100 Sec In the secondary cooling process from the primary cooling stop temperature to the secondary cooling stop temperature, the retention time between these temperatures needs to be controlled in order to concentrate carbon into austenite to form retained austenite. When the retention time from the primary cooling stop temperature to the secondary cooling stop temperature is longer, more carbon concentrates into austenite, and the resultant retained austenite improves the elongation. The retention time from the primary cooling stop temperature to the secondary cooling stop temperature is therefore 20 sec or more, preferably 25 sec or more, and more preferably 30 sec or more. If the retention time from the primary cooling stop temperature to the secondary cooling stop temperature is excessively long, bainite forms, and the yield ratio increases. The retention time from the primary cooling stop temperature to the secondary cooling stop temperature is therefore 100 sec or less, preferably 90 sec or less, and more preferably 80 sec or less.

Secondary Cooling Stop Temperature: 400° C. or More and 500° C. or Less

The temperature range of more than 500° C. is the temperature range in which pearlite forms. Accordingly, if the secondary cooling stop temperature is more than 500° C., due to formation of pearlite, TS×El decreases and the workability degrades. The secondary cooling stop temperature is therefore 500° C. or less, and preferably 490° C. or less. If the secondary cooling stop temperature is less than 400° C., the amount of carbides formed in bainite is excessively high, and the amount of carbon concentrating into austenite decreases. This causes a decrease in the amount of retained austenite, as a result of which TS×El decreases and the workability degrades. The secondary cooling stop temperature is therefore 400° C. or more, and preferably 440° C. or more.

[Coating or Plating Process]

The production method according to the present disclosure may further include a coating or plating process of performing a coating or plating treatment on at least one side (surface) of the steel sheet after the secondary cooling in the annealing process and, in some cases, after the below-described other processes. Here, it is desirable that the coating or plating process does not change the properties of the steel sheet as the steel substrate. As mentioned earlier with regard to the coated or plated layer, for example, a Zn-based coated or plated layer or an Al-based coated or plated layer can be formed in the coating or plating process. The coating or plating process may be performed by a known method such as a dry method or a wet method. A wet method such as hot-dip coating or electroplating is preferable from the viewpoint of coating or plating a large area efficiently at low cost. Hot-dip coating is more preferable and hot-dip galvanizing is further preferable, from the viewpoint of facilitating adjustment of various coating or plating properties. The coating or plating process may be performed by a known method.

[Other Processes]

In addition to the foregoing processes, the production method according to the present disclosure may further include other processes such as a temper rolling process for shape adjustment after the annealing process. Instead of or in addition to this, the production method according to the present disclosure may further include other processes such as a temper rolling process for shape adjustment and a heat treatment process for dehydrogenation after the coating or plating process. The conditions of the other processes are not limited, and may be in accordance with conventional methods. If the temperature in the heat treatment process for dehydrogenation is high, the properties change as a result of tempering. The temperature is therefore preferably 100° C. or less.

With the above-described production method according to the present disclosure, the hot rolling process, the cold rolling process, and the annealing process are performed under the predetermined conditions. In this way, the phase fraction and the Mn concentration distribution in the steel microstructure of the steel sheet can be controlled, with it being possible to obtain a steel sheet having excellent workability while ensuring strength. The obtained steel sheet can be suitably used for automotive members such as automotive bodies.

Examples

The presently disclosed techniques will be described in detail below by way of examples. The following examples are merely preferred examples according to the present disclosure, and the present disclosure is not limited to the following examples. Modifications can be made to the following examples within the range in which the subject matter of the present disclosure is applicable, with all such modifications being also included in the technical scope of the present disclosure.

Production of Steel Sheet for Evaluation

Steel slabs having the chemical compositions shown in Table 1 with the balance consisting of Fe and inevitable impurities were each obtained by steelmaking in a vacuum melting furnace, and then subjected to blooming to obtain a bloomed material of 27 mm in thickness.

The obtained bloomed material was hot rolled to a thickness of 4.0 mm under the conditions shown in Table 2 to obtain a hot-rolled sheet. After this, the hot-rolled sheet was ground to a thickness of 3.0 mm, and then cold rolled to a thickness of 1.8 mm to 0.9 mm under the conditions shown in Table 2 to obtain a cold-rolled sheet. The obtained cold-rolled sheet was annealed under the conditions shown in Table 2, and, in some examples, further subjected to a coating or plating treatment under the conditions shown in Table 2, thus producing a steel sheet.

The coating weight was measured by an inductively coupled plasma (ICP) method. More specifically, the surface of the steel sheet on which the coated or plated layer was formed was degreased to obtain a test piece, and then the primary basis weight was determined using a high-precision scale. After this, the test piece was placed in 30 cc of 1:3 HCl solution so that the solution would not leak, and 2 to 3 drops of inhibitor were added to the solution. After the generation of $H_2$ gas on the surface of the test piece ended, the solution was collected. Subsequently, the test piece was completely dried and then the secondary basis weight was determined. The value obtained by dividing the difference between the primary basis weight value and the secondary basis weight value by the unit area was taken to be the coating weight of the coated or plated layer.

Each blank in Table 1 indicates that the element was intentionally not added. In this case, the content of the element is not necessarily 0 mass %, as the element may be contained as an inevitable impurity.

Each blank in Table 2 indicates that the coating or plating process was not performed. In the "coating or plating method" in Table 2, "GI", "GA", and "EG" respectively denote hot-dip galvanizing (GI), galvannealing (GA), and electrogalvanizing (EG).

For electrogalvanizing in the production of each steel sheet for evaluation, an electroplating solution obtained by adding 440 g/L of zinc sulfate heptahydrate to pure water and adjusting the pH to 2.0 with sulfuric acid was used for pure Zn (Nos. 13 and 14 in Table 2), an electroplating solution obtained by adding 150 g/L of zinc sulfate heptahydrate and 350 g/L of nickel sulfate hexahydrate to pure water and adjusting the pH to 1.3 with sulfuric acid was used for Zn—Ni (No. 15 in Table 2), and an electroplating solution obtained by adding 50 g/L of zinc sulfate heptahydrate and 350 g/L of Fe sulfate to pure water and adjusting the pH to 2.0 with sulfuric acid was used for Zn—Fe (No. 16 in Table 2).

TABLE 1

| Steel sample ID | Chemical composition (mass%) | | | | | | | | | | | | | | $A_{c1}$ point (°C.) | $A_{c3}$ point (°C.) |
|---|---|---|---|---|---|---|---|---|---|---|---|---|---|---|---|---|
| | C | Si | Mn | P | S | Al | N | B | Nb | Ti | Cr | Mo | V | Other | | |
| A | 0.13 | 0.7 | 1.9 | 0.013 | 0.007 | 0.02 | 0.004 | | | | | | | | 704 | 821 |
| B | 0.08 | 1.1 | 2.1 | 0.020 | 0.013 | 0.05 | 0.009 | | | | | | | | 709 | 862 |
| C | 0.16 | 0.7 | 2.3 | 0.010 | 0.007 | 0.10 | 0.005 | | | | | | | | 697 | 837 |
| D | 0.10 | 0.5 | 1.9 | 0.018 | 0.008 | 0.02 | 0.010 | | | | | | | | 700 | 821 |
| E | 0.13 | 1.4 | 2.1 | 0.014 | 0.012 | 0.03 | 0.006 | | | | | | | | 716 | 851 |
| F | 0.12 | 1.1 | 1.7 | 0.018 | 0.004 | 0.04 | 0.009 | | | | | | | | 717 | 857 |
| G | 0.11 | 0.8 | 2.5 | 0.017 | 0.014 | 0.06 | 0.008 | | | | | | | | 696 | 831 |
| H | 0.11 | 1.0 | 1.9 | 0.012 | 0.009 | 0.08 | 0.008 | 0.0015 | | | | | | | 711 | 867 |
| I | 0.12 | 1.0 | 2.0 | 0.010 | 0.004 | 0.02 | 0.006 | 0.0010 | | | 0.012 | | | | 709 | 839 |
| J | 0.10 | 0.7 | 2.3 | 0.005 | 0.005 | 0.02 | 0.009 | | | | | 0.02 | | | 697 | 818 |
| K | 0.14 | 0.9 | 2.1 | 0.017 | 0.005 | 0.07 | 0.008 | | 0.025 | | | | | | 705 | 844 |
| L | 0.12 | 0.8 | 2.1 | 0.019 | 0.006 | 0.03 | 0.008 | | | 0.02 | | 0.05 | | | 704 | 827 |
| M | 0.12 | 0.7 | 2.2 | 0.013 | 0.014 | 0.03 | 0.002 | | | | 0.015 | | 0.02 | | 699 | 827 |
| N | <u>0.18</u> | 0.7 | 2.0 | 0.009 | 0.013 | 0.07 | 0.009 | | | | | | | | 702 | 828 |
| O | <u>0.06</u> | 0.7 | 1.9 | 0.008 | 0.006 | 0.02 | 0.009 | | | | | | | | 704 | 844 |
| P | 0.12 | <u>1.6</u> | 2.3 | 0.014 | 0.009 | 0.04 | 0.003 | | | | | | | | 717 | 861 |
| Q | 0.12 | <u>0.4</u> | 2.2 | 0.010 | 0.010 | 0.09 | 0.009 | | | | | | | | 692 | 833 |
| R | 0.10 | <u>0.7</u> | 2.6 | 0.012 | 0.014 | 0.06 | 0.008 | | | | | | | | 692 | 827 |
| S | 0.13 | 0.8 | <u>1.6</u> | 0.019 | 0.007 | 0.02 | 0.004 | | | | | | | | 712 | 834 |
| T | 0.12 | 0.9 | <u>2.2</u> | 0.013 | 0.003 | <u>0.25</u> | 0.009 | | | | | | | | 703 | 929 |
| U | 0.12 | 0.8 | 2.1 | 0.013 | 0.003 | <u>0.004</u> | 0.009 | | | | | | | | 703 | 815 |
| V | 0.12 | 0.7 | 2.0 | 0.015 | 0.013 | <u>0.02</u> | <u>0.120</u> | | | | | | | | 702 | 820 |
| W | 0.14 | 1.0 | 2.1 | 0.013 | 0.007 | 0.02 | 0.004 | | | | | | | Ta: 0.01 | 707 | 825 |
| X | 0.14 | 1.0 | 2.1 | 0.013 | 0.007 | 0.02 | 0.004 | 0.0015 | | | | | | W: 0.01 | 707 | 825 |
| Y | 0.14 | 1.0 | 2.1 | 0.013 | 0.007 | 0.02 | 0.004 | | | | | | | Ni: 0.01 | 707 | 825 |
| Z | 0.14 | 1.0 | 2.1 | 0.013 | 0.007 | 0.02 | 0.004 | | 0.025 | | | | | Cu: 0.05 | 707 | 824 |
| AA | 0.14 | 1.0 | 2.1 | 0.013 | 0.007 | 0.02 | 0.004 | | | | | | | Sb: 0.01 | 707 | 825 |
| AB | 0.12 | 0.8 | 2.3 | 0.013 | 0.007 | 0.02 | 0.004 | | | 0.02 | | | | Sn: 0.01 | 700 | 824 |
| AC | 0.12 | 0.8 | 2.3 | 0.013 | 0.007 | 0.02 | 0.004 | | | | | | | Ca: 0.003 | 699 | 816 |
| AD | 0.12 | 0.8 | 2.3 | 0.013 | 0.007 | 0.02 | 0.004 | | | | | 0.06 | | Mg: 0.002 | 700 | 817 |
| AE | 0.12 | 0.8 | 2.3 | 0.013 | 0.007 | 0.02 | 0.004 | | | | | | 0.015 | Zr: 0.05 | 699 | 816 |

Underlines indicate outside the range according to the present disclosure.

TABLE 2-1

| | | Hot rolling | | | | | Annealing | | | | | | | Coating or plating | | |
|---|---|---|---|---|---|---|---|---|---|---|---|---|---|---|---|---|
| No. | Steel sample ID | Slab heating temperature °C. | Rolling finish temperature °C. | Coiling temperature °C. | Cold rolling Rolling ratio % | Thickness mm | Average heating rate*1 °C./sec | Annealing temperature °C. | Annealing hold time sec | Average primary cooling rate*2 °C./sec | Primary cooling stop temperature °C. | Retention time*3 sec | Secondary cooling stop temperature | Coating or plating method | Coating weight g/m² | Remarks |
| 1 | A | 1250 | 880 | 550 | 53 | 1.4 | 3 | 820 | 5 | 28 | 500 | 60 | 450 | | | Example |
| 2 | | 1250 | 880 | 550 | 53 | 1.4 | 5 | 820 | 14 | 27 | 530 | 40 | 470 | | | Example |
| 3 | | 1250 | 880 | 550 | 53 | 1.4 | 3 | 820 | 33 | 28 | 530 | 50 | 480 | | | Example |
| 4 | | 1250 | 880 | 550 | 53 | 1.4 | 5 | 820 | 30 | 30 | 530 | 70 | 490 | | | Example |
| 5 | B | 1250 | 880 | 550 | 53 | 1.4 | 5 | 840 | 15 | 27 | 520 | 40 | 480 | GI | 44 | Example |
| 6 | | 1230 | 880 | 550 | 53 | 1.4 | 3 | 840 | 14 | 26 | 510 | 50 | 480 | GI | 43 | Example |
| 7 | | 1200 | 880 | 550 | 53 | 1.4 | 3 | 840 | 16 | 30 | 540 | 70 | 450 | GI | 37 | Example |
| 8 | | <u>1180</u> | 880 | 550 | 53 | 1.4 | 4 | 840 | 11 | 29 | 500 | 60 | 480 | GI | 36 | Comparative Example |
| 9 | C | 1250 | 880 | 550 | 60 | 1.2 | 3 | 840 | 15 | 25 | 500 | 60 | 470 | GA | 39 | Example |
| 10 | | 1250 | <u>830</u> | 550 | 60 | 1.2 | 5 | 840 | 11 | 23 | 520 | 70 | 450 | GA | 35 | Comparative Example |
| 11 | | 1250 | <u>920</u> | 550 | 60 | 1.2 | 4 | 840 | 16 | 27 | 490 | 40 | 490 | GA | 40 | Comparative Example |
| 12 | | 1250 | 840 | 550 | 60 | 1.2 | 5 | 840 | 12 | 28 | 530 | 40 | 480 | GA | 44 | Example |
| 13 | D | 1250 | 880 | 550 | 53 | 1.4 | 4 | 820 | 19 | 23 | 530 | 70 | 480 | EG | 36 | Example |
| 14 | | 1250 | 880 | 450 | 53 | 1.4 | 4 | 820 | 18 | 29 | 500 | 40 | 480 | EG | 38 | Example |
| 15 | | 1250 | 880 | <u>670</u> | 53 | 1.4 | 4 | 820 | 13 | 27 | 480 | 70 | 450 | EG | 36 | Comparative Example |
| 16 | | 1250 | 880 | 460 | 53 | 1.4 | 4 | 820 | 20 | 25 | 500 | 40 | 460 | EG | 37 | Example |
| 17 | E | 1250 | 880 | 550 | 53 | 1.4 | 5 | 820 | 11 | 20 | 510 | 70 | 480 | | | Example |

TABLE 2-1-continued

| | | Hot rolling | | | Cold rolling | | Annealing | | | | | | | Coating or plating | | |
|---|---|---|---|---|---|---|---|---|---|---|---|---|---|---|---|---|
| | | Slab heating temperature ° C. | Rolling finish temperature ° C. | Coiling temperature ° C. | Rolling ratio % | Thickness mm | Average heating rate*1 ° C./sec | Annealing temperature ° C. | Annealing hold time sec | Average primary cooling rate*2 ° C./sec | Primary cooling stop temperature ° C. | Retention time*3 sec | Secondary cooling stop temperature | Coating or plating method | Coating weight g/m² | Remarks |
| No. | Steel sample ID | | | | | | | | | | | | | | | |
| 18 | | 1250 | 880 | 550 | 53 | 1.4 | 5 | 820 | 20 | 22 | 540 | 50 | 480 | | | Example |
| 19 | | 1250 | 880 | 550 | 53 | 1.4 | 5 | 820 | 11 | 29 | 530 | 50 | 490 | | | Example |
| 20 | | 1250 | 880 | 550 | 53 | 1.4 | 5 | 820 | 19 | 20 | 490 | 40 | 450 | | | Example |
| 21 | F | 1250 | 880 | 550 | 53 | 1.4 | <u>0.4</u> | 860 | 12 | 22 | 490 | 50 | 440 | GI | 42 | Comparative Example |
| 22 | | 1250 | 880 | 550 | 53 | 1.4 | 5 | 860 | 17 | 21 | 520 | 70 | 480 | GI | 40 | Example |
| 23 | | 1250 | 880 | 550 | 53 | 1.4 | <u>8</u> | 860 | 14 | 21 | 510 | 60 | 450 | GI | 37 | Comparative Example |
| 24 | | 1250 | 880 | 550 | 53 | 1.4 | 7 | 860 | 18 | 24 | 520 | 60 | 470 | GI | 26 | Example |
| 25 | G | 1250 | 880 | 550 | 70 | 0.9 | 3 | 820 | 12 | 29 | 480 | 70 | 440 | GI | 37 | Example |
| 26 | | 1250 | 880 | 550 | 70 | 0.9 | 5 | <u>740</u> | 11 | 27 | 550 | 40 | 460 | GI | 36 | Comparative Example |
| 27 | | 1250 | 880 | 550 | 70 | 0.9 | 4 | 780 | 12 | 25 | 520 | 40 | 490 | GI | 41 | Example |
| 28 | | 1250 | 880 | 550 | 70 | 0.9 | 5 | <u>860</u> | 19 | 22 | 480 | 70 | 490 | GI | 37 | Comparative Example |
| 29 | H | 1250 | 880 | 550 | 53 | 1.4 | 4 | 860 | 12 | 22 | 540 | 50 | 440 | GI | 45 | Example |
| 30 | | 1250 | 880 | 550 | 53 | 1.4 | 3 | 860 | <u>0.4</u> | 30 | 550 | 60 | 470 | GI | 39 | Comparative Example |
| 31 | | 1250 | 880 | 550 | 53 | 1.4 | 5 | 860 | 18 | 22 | 520 | 60 | 450 | GI | 42 | Example |
| 32 | | 1250 | 880 | 550 | 53 | 1.4 | 5 | 860 | 4 | 26 | 520 | 60 | 440 | GI | 37 | Example |
| 33 | I | 1250 | 880 | 550 | 53 | 1.4 | 5 | 840 | 13 | 14 | 480 | 40 | 480 | GI | 40 | Example |
| 34 | | 1250 | 880 | 550 | 53 | 1.4 | 4 | 840 | 16 | 8 | 530 | 50 | 460 | GI | 36 | Comparative Example |
| 35 | | 1250 | 880 | 550 | 53 | 1.4 | 4 | 840 | 10 | 43 | 500 | 60 | 470 | GI | 39 | Example |
| 36 | | 1250 | 880 | 550 | 53 | 1.4 | 5 | 840 | 19 | 55 | 480 | 70 | 450 | GI | 42 | Comparative Example |

Underlines indicate outside the range according to the present disclosure.
*1: Average heating rate from 600° C. to annealing temperature
*2: Average cooling rate from annealing temperature to primary cooling stop temperature
*3: Retention time from primary cooling stop temperature to secondary cooling stop temperature

TABLE 2-2

| | | Hot rolling | | | Cold rolling | | Annealing | | | | | | | Coating or plating | | |
|---|---|---|---|---|---|---|---|---|---|---|---|---|---|---|---|---|
| No. | Steel sample ID | Slab heating temperature ° C. | Rolling finish temperature ° C. | Coiling temperature ° C. | Rolling ratio % | Thickness mm | Average heating rate*1 ° C./sec | Annealing temperature ° C. | Annealing hold time sec | Average primary cooling rate*2 ° C./sec | Primary cooling stop temperature ° C. | Retention time*3 sec | Secondary cooling stop temperature | Coating or plating method | Coating weight g/m² | Remarks |
| 37 | J | 1250 | 880 | 550 | 53 | 1.4 | 3 | 830 | 13 | 28 | 540 | 40 | 490 | GI | 38 | Example |
| 38 | | 1250 | 880 | 550 | 53 | 1.4 | 5 | 830 | 13 | 22 | 480 | <u>15</u> | 480 | GI | 37 | Comparative Example |
| 39 | | 1250 | 880 | 550 | 53 | 1.4 | 5 | 830 | 19 | 23 | 510 | 25 | 460 | GI | 38 | Example |
| 40 | | 1250 | 880 | 550 | 53 | 1.4 | 3 | 830 | 18 | 30 | 500 | 20 | 480 | GI | 40 | Example |
| 41 | K | 1250 | 880 | 500 | 53 | 1.4 | 1 | 840 | 18 | 29 | 520 | 50 | 450 | GA | 40 | Example |
| 42 | | 1250 | 880 | 600 | 53 | 1.4 | 3 | 840 | 16 | 24 | 490 | 40 | 460 | GA | 38 | Example |
| 43 | | 1250 | 880 | 650 | 53 | 1.4 | 6 | 840 | 15 | 22 | 490 | 40 | 450 | GA | 37 | Example |
| 44 | | 1250 | 880 | 550 | 53 | 1.4 | <u>9</u> | 840 | 20 | 23 | 480 | 40 | 490 | GA | 42 | Comparative Example |
| 45 | L | 1250 | 880 | 550 | 40 | 1.8 | 4 | 820 | 20 | 25 | 490 | 50 | 460 | GA | 39 | Example |

TABLE 2-2-continued

| | | Hot rolling | | | | | Annealing | | | | | | Coating or plating | | |
|---|---|---|---|---|---|---|---|---|---|---|---|---|---|---|---|
| | | Slab heating temperature °C. | Rolling finish temperature °C. | Coiling temperature °C. | Cold rolling | | Average heating rate*1 °C./sec | Annealing temperature °C. | Annealing hold ing time sec | Average primary cooling rate*2 °C./sec | Primary cooling stop temperature °C. | Retention time*3 sec | Secondary cooling stop temperature | Coating or plating method | Coating weight g/m² | |
| No. | Steel sample ID | | | | Rolling ratio % | Thickness mm | | | | | | | | | | Remarks |
| 46 | | 1250 | 880 | 550 | 40 | 1.8 | 5 | 820 | <u>40</u> | 22 | 500 | 40 | 440 | GA | 44 | Comparative Example |
| 47 | | 1250 | 880 | 550 | 40 | 1.8 | 5 | 820 | 25 | 25 | 530 | 60 | 440 | GA | 43 | Example |
| 48 | | 1250 | 880 | 550 | 40 | 1.8 | 3 | 820 | 35 | 22 | 530 | 40 | 480 | GA | 37 | Example |
| 49 | M | 1250 | 880 | 550 | 53 | 1.4 | 5 | 820 | 19 | 26 | 480 | 40 | 440 | GA | 44 | Example |
| 50 | | 1250 | 880 | 550 | 53 | 1.4 | 4 | 820 | 12 | 20 | 510 | <u>120</u> | 460 | GA | 45 | Comparative Example |
| 51 | | 1250 | 880 | 550 | 53 | 1.4 | 3 | 820 | 18 | 22 | 520 | 100 | 440 | GA | 44 | Example |
| 52 | | 1250 | 880 | 550 | 53 | 1.4 | 3 | 820 | 14 | 20 | 490 | 80 | 440 | GI | 35 | Example |
| 53 | <u>N</u> | 1250 | 880 | 550 | 53 | 1.4 | 5 | 830 | 10 | 20 | 540 | 60 | 440 | GI | 39 | Comparative Example |
| 54 | <u>O</u> | 1250 | 880 | 550 | 53 | 1.4 | 4 | 840 | 19 | 23 | 500 | 40 | 480 | GI | 40 | Comparative Example |
| 55 | <u>P</u> | 1250 | 880 | 550 | 53 | 1.4 | 5 | 850 | 14 | 20 | 530 | 40 | 470 | GI | 40 | Comparative Example |
| 56 | <u>Q</u> | 1250 | 880 | 550 | 53 | 1.4 | 4 | 830 | 19 | 23 | 530 | 50 | 460 | GI | 39 | Comparative Example |
| 57 | <u>R</u> | 1250 | 880 | 550 | 53 | 1.4 | 4 | 820 | 13 | 23 | 480 | 50 | 490 | GI | 42 | Comparative Example |
| 58 | <u>S</u> | 1250 | 880 | 550 | 53 | 1.4 | 5 | 830 | 14 | 20 | 510 | 70 | 490 | GI | 36 | Comparative Example |
| 59 | <u>T</u> | 1250 | 880 | 550 | 53 | 1.4 | 4 | 900 | 10 | 26 | 490 | 40 | 480 | GI | 38 | Comparative Example |
| 60 | <u>U</u> | 1250 | 880 | 550 | 53 | 1.4 | 4 | <u>900</u> | 10 | 26 | 490 | 40 | 440 | GI | 34 | Comparative Example |
| 61 | <u>V</u> | 1250 | 880 | 550 | 53 | 1.4 | 3 | 800 | 20 | 20 | 490 | 70 | 460 | GI | 36 | Comparative Example |
| 62 | A | 1250 | 880 | 550 | 53 | 1.4 | 5 | 820 | 3 | 40 | 500 | 80 | 460 | GI | 44 | Example |
| 63 | W | 1250 | 880 | 550 | 53 | 1.4 | 5 | 840 | 15 | 27 | 520 | 40 | 480 | GI | 40 | Example |
| 64 | X | 1250 | 880 | 550 | 53 | 1.4 | 3 | 840 | 14 | 26 | 510 | 50 | 480 | GI | 44 | Example |
| 65 | Y | 1250 | 880 | 550 | 53 | 1.4 | 3 | 840 | 16 | 30 | 540 | 70 | 450 | GI | 41 | Example |
| 66 | Z | 1250 | 880 | 550 | 53 | 1.4 | 5 | 840 | 15 | 27 | 520 | 40 | 480 | GI | 45 | Example |
| 67 | AA | 1250 | 880 | 550 | 53 | 1.4 | 3 | 840 | 14 | 26 | 510 | 50 | 480 | GI | 44 | Example |
| 68 | AB | 1250 | 880 | 550 | 53 | 1.4 | 3 | 800 | 16 | 30 | 540 | 70 | 450 | GI | 43 | Example |
| 69 | AC | 1200 | 880 | 550 | 53 | 1.4 | 3 | 800 | 16 | 30 | 540 | 70 | 450 | GI | 44 | Example |
| 70 | AD | 1250 | 880 | 550 | 53 | 1.4 | 5 | 800 | 15 | 27 | 520 | 40 | 480 | GI | 42 | Example |
| 71 | AE | 1200 | 880 | 550 | 53 | 1.4 | 3 | 800 | 14 | 26 | 510 | 50 | 480 | GI | 44 | Example |

Underlines indicate outside the range according to the present disclosure.
*1: Average heating rate from 600° C. to annealing temperature
*2: Average cooling rate from annealing temperature to primary cooling stop temperature
*3: Retention time from primary cooling stop temperature to secondary cooling stop temperature For each obtained steel sheet, the area ratio of each phase and the Mn concentration in the steel sheet (steel substrate) microstructure and the mechanical properties of the steel sheet (steel substrate) were measured according to the foregoing procedures. Specifically, in microstructure identification (point counting method), a 16×15 grid was placed with equal intervals on a SEM observation region (a region of 82 μm×57 μm). The number of grid points occupied by each phase was counted, and the ratio of the number of grid points occupied by each phase to the total number of grid points was taken to be the area ratio of each phase. The area ratio of each phase was the average value of the area ratios of the phase obtained from three separate SEM images.

The workability was evaluated based on the following criteria.

⊚: TS×El: 16500 MPa·% or more and YR: 0.75 or less.

○: TS×El: 16000 MPa·% or more and YR: 0.80 or less (excluding ⊚).

x: TS×El: less than 16000 MPa·% and/or YR: more than 0.80.

Pass/fail determination as a steel sheet was made based on the following criteria. Each steel sheet determined as pass is indicated as Example in the remarks in Table 3, and each steel sheet determined as fail is indicated as Comparative Example in the remarks in Table 3. The results are shown in Table 3.

Pass: TS: 750 MPa or more and workability: ○ or ⊚.

Fail: TS: less than 750 MPa and/or workability: x.

TABLE 3-1

| No. | Steel sample ID | α % | M % | B % | Retained γ % | Other % | $[Mn]_M/[Mn]$ | $[Mn]_M/[Mn]_F$ | YS MPa | TS MPa | YR — | TS × El MPa·% | Evaluation Workability | Remarks |
|---|---|---|---|---|---|---|---|---|---|---|---|---|---|---|
| 1 | A | 64 | 20 | 9 | 7 | 0 | 1.05 | 1.08 | 514 | 820 | 0.63 | 16920 | ⊚ | Example |
| 2 |   | 61 | 20 | 11 | 8 | 0 | 1.06 | 1.1 | 535 | 822 | 0.65 | 17456 | ⊚ | Example |
| 3 |   | 63 | 20 | 9 | 8 | 0 | 1.09 | 1.23 | 603 | 818 | 0.74 | 17454 | ⊚ | Example |
| 4 |   | 61 | 21 | 9 | 9 | 0 | 1.1 | 1.19 | 586 | 823 | 0.71 | 17683 | ⊚ | Example |
| 5 | B | 66 | 19 | 6 | 9 | 0 | 1.07 | 1.1 | 536 | 788 | 0.68 | 17639 | ⊚ | Example |
| 6 |   | 66 | 19 | 8 | 7 | 0 | 1.07 | 1.09 | 537 | 790 | 0.68 | 16997 | ⊚ | Example |
| 7 |   | 63 | 19 | 9 | 9 | 0 | 1.08 | 1.11 | 534 | 785 | 0.68 | 16155 | ○ | Example |
| 8 |   | 59 | 20 | 6 | 9 | 6 | 1.08 | 1.1 | 536 | 789 | 0.68 | 15998 | X | Comparative Example |
| 9 | C | 49 | 19 | 23 | 9 | 0 | 1.06 | 1.11 | 604 | 848 | 0.71 | 17200 | ⊚ | Example |
| 10 |   | 51 | 18 | 17 | 8 | 6 | 1.07 | 1.09 | 606 | 851 | 0.71 | 15927 | X | Comparative Example |
| 11 |   | 44 | 21 | 19 | 7 | 9 | 1.06 | 1.1 | 612 | 846 | 0.72 | 15826 | X | Comparative Example |
| 12 |   | 51 | 19 | 21 | 9 | 0 | 1.07 | 1.09 | 605 | 850 | 0.71 | 16928 | ⊚ | Example |
| 13 | D | 58 | 20 | 13 | 9 | 0 | 1.06 | 1.09 | 576 | 808 | 0.71 | 17383 | ⊚ | Example |
| 14 |   | 56 | 21 | 14 | 9 | 0 | 1.08 | 1.11 | 578 | 811 | 0.71 | 17560 | ⊚ | Example |
| 15 |   | 56 | 19 | 12 | 7 | 6 | 1.08 | 1.11 | 574 | 806 | 0.71 | 15979 | X | Comparative Example |
| 16 |   | 54 | 20 | 17 | 9 | 0 | 1.08 | 1.09 | 576 | 809 | 0.71 | 17457 | ⊚ | Example |
| 17 | E | 64 | 21 | 6 | 9 | 0 | 1.07 | 1.09 | 600 | 828 | 0.72 | 17353 | ⊚ | Example |
| 18 |   | 68 | 19 | 5 | 8 | 0 | 1.08 | 1.11 | 601 | 830 | 0.72 | 17502 | ⊚ | Example |
| 19 |   | 64 | 20 | 8 | 8 | 0 | 1.06 | 1.09 | 598 | 825 | 0.72 | 17308 | ⊚ | Example |
| 20 |   | 66 | 18 | 7 | 9 | 0 | 1.08 | 1.1 | 599 | 827 | 0.72 | 17190 | ⊚ | Example |
| 21 | F | 42 | 19 | 31 | 8 | 0 | 1.16 | 1.32 | 646 | 788 | 0.82 | 17595 | X | Comparative Example |
| 22 |   | 64 | 21 | 7 | 8 | 0 | 1.06 | 1.09 | 548 | 791 | 0.69 | 17612 | ⊚ | Example |
| 23 |   | 65 | 26 | 8 | 1 | 0 | 1.07 | 1.1 | 545 | 787 | 0.69 | 15446 | X | Comparative Example |
| 24 |   | 68 | 21 | 5 | 6 | 0 | 1.08 | 1.09 | 544 | 786 | 0.69 | 16993 | ⊚ | Example |
| 25 | G | 54 | 19 | 19 | 8 | 0 | 1.06 | 1.11 | 545 | 836 | 0.65 | 17617 | ⊚ | Example |
| 26 |   | 82 | 4 | 11 | 3 | 0 | 1.06 | 1.1 | 320 | 739 | 0.43 | 15916 | X | Comparative Example |
| 27 |   | 55 | 19 | 18 | 8 | 0 | 1.08 | 1.11 | 545 | 785 | 0.69 | 16998 | ⊚ | Example |
| 28 |   | 34 | 42 | 15 | 9 | 0 | 1.07 | 1.1 | 556 | 857 | 0.65 | 15480 | X | Comparative Example |
| 29 | H | 64 | 21 | 8 | 7 | 0 | 1.06 | 1.1 | 528 | 822 | 0.64 | 17578 | ⊚ | Example |
| 30 |   | 65 | 20 | 6 | 2 | 7 | 1.02 | 1.07 | 511 | 825 | 0.62 | 15930 | X | Comparative Example |
| 31 |   | 65 | 22 | 6 | 7 | 0 | 1.07 | 1.09 | 527 | 820 | 0.64 | 17549 | ⊚ | Example |
| 32 |   | 67 | 19 | 6 | 8 | 0 | 1.03 | 1.1 | 510 | 824 | 0.62 | 17068 | ⊚ | Example |
| 33 | I | 66 | 16 | 7 | 8 | 3 | 1.06 | 1.11 | 554 | 840 | 0.66 | 16869 | ⊚ | Example |
| 34 |   | 66 | 16 | 6 | 5 | 7 | 1.08 | 1.1 | 555 | 842 | 0.66 | 15842 | X | Comparative Example |
| 35 |   | 55 | 17 | 19 | 9 | 0 | 1.07 | 1.09 | 603 | 838 | 0.72 | 17107 | ⊚ | Example |
| 36 |   | 41 | 18 | 34 | 7 | 0 | 1.06 | 1.09 | 683 | 839 | 0.81 | 17221 | X | Comparative Example |

Underlines indicate outside the range according to the present disclosure.
α: area ratio of ferrite, M: area ratio of martensite, B: area ratio of bainite Retained γ: area ratio of retained austenite, Other: area ratio of other metallic phase

TABLE 3-2

| No. | Steel sample ID | α % | M % | B % | Retained γ % | Other % | $[Mn]_M/[Mn]$ | $[Mn]_M/[Mn]_F$ | YS MPa | TS MPa | YR — | TS × El MPa·% | Evaluation Workability | Remarks |
|---|---|---|---|---|---|---|---|---|---|---|---|---|---|---|
| 37 | J | 62 | 19 | 10 | 9 | 0 | 1.06 | 1.1 | 537 | 834 | 0.64 | 17275 | ⊚ | Example |
| 38 |   | 61 | 28 | 10 | 1 | 0 | 1.08 | 1.11 | 539 | 837 | 0.64 | 15038 | X | Comparative Example |
| 39 |   | 61 | 22 | 11 | 6 | 0 | 1.06 | 1.1 | 535 | 832 | 0.64 | 16871 | ⊚ | Example |
| 40 |   | 58 | 29 | 9 | 4 | 0 | 1.07 | 1.09 | 538 | 836 | 0.64 | 16272 | ○ | Example |
| 41 | K | 60 | 22 | 10 | 8 | 0 | 1.13 | 1.27 | 632 | 842 | 0.75 | 17235 | ⊚ | Example |

TABLE 3-2-continued

| | Steel | Microstructure | | | | | | | Mechanical properties | | | | | |
|---|---|---|---|---|---|---|---|---|---|---|---|---|---|---|
| No. | sample ID | α % | M % | B % | Retained γ % | Other % | $[Mn]_M/[Mn]$ | $[Mn]_M/[Mn]_F$ | YS MPa | TS MPa | YR — | TS × El MPa·% | Evaluation Workability | Remarks |
| 42 | | 61 | 18 | 14 | 7 | 0 | 1.08 | 1.11 | 584 | 844 | 0.69 | 17077 | ◎ | Example |
| 43 | | 61 | 23 | 10 | 6 | 0 | 1.06 | 1.09 | 581 | 840 | 0.69 | 16400 | ○ | Example |
| 44 | | 61 | 27 | 11 | <u>1</u> | 0 | 1.08 | 1.1 | 582 | 841 | 0.69 | 15390 | X | Comparative Example |
| 45 | L | 67 | 20 | 5 | <u>8</u> | 0 | 1.08 | 1.1 | 557 | 844 | 0.66 | <u>17461</u> | ◎ | Example |
| 46 | | 63 | 22 | 8 | 7 | 0 | 1.1 | <u>1.33</u> | 689 | 846 | 0.81 | 17217 | X | Comparative Example |
| 47 | | 64 | 21 | 6 | 9 | 0 | 1.11 | <u>1.14</u> | 585 | 841 | 0.70 | 17290 | ◎ | Example |
| 48 | | 67 | 18 | 8 | 7 | 0 | 1.09 | 1.22 | 606 | 843 | 0.72 | 17175 | ◎ | Example |
| 49 | M | 60 | 20 | 11 | 9 | 0 | 1.08 | 1.1 | 560 | 848 | 0.66 | 17467 | ◎ | Example |
| 50 | | 61 | <u>2</u> | <u>29</u> | 8 | 0 | 1.07 | 1.11 | 692 | 851 | 0.81 | 17161 | X | Comparative Example |
| 51 | | 62 | <u>10</u> | <u>21</u> | 7 | 0 | 1.06 | 1.09 | 658 | 845 | 0.78 | 17497 | ○ | Example |
| 52 | | 64 | 10 | 17 | 9 | 0 | 1.08 | 1.1 | 590 | 849 | 0.69 | 17210 | ◎ | Example |
| 53 | N | <u>46</u> | 21 | <u>26</u> | 7 | 0 | 1.06 | 1.1 | 701 | 844 | 0.83 | 16597 | X | Comparative Example |
| 54 | <u>O</u> | 61 | 20 | <u>11</u> | 8 | 0 | 1.08 | 1.1 | 514 | 742 | 0.69 | 17655 | ◎ | Comparative Example |
| 55 | <u>P</u> | 59 | 22 | 10 | 9 | 0 | 1.06 | 1.09 | 672 | 832 | 0.81 | 17300 | X | Comparative Example |
| 56 | <u>Q</u> | 50 | 14 | 30 | 6 | 0 | 1.08 | 1.1 | 675 | 828 | 0.82 | 17598 | X | Comparative Example |
| 57 | <u>R</u> | 51 | 16 | <u>27</u> | 6 | 0 | 1.07 | 1.09 | 685 | 836 | 0.82 | 17388 | X | Comparative Example |
| 58 | <u>S</u> | 62 | 20 | <u>9</u> | 9 | 0 | 1.07 | 1.11 | 506 | 738 | 0.69 | 17696 | ◎ | Comparative Example |
| 59 | <u>T</u> | 62 | 22 | 8 | 8 | 0 | 1.08 | 1.11 | 540 | 828 | 0.65 | 15689 | X | Comparative Example |
| 60 | <u>U</u> | 62 | 22 | 8 | 8 | 0 | 1.07 | 1.09 | 536 | 820 | 0.65 | <u>15469</u> | X | Comparative Example |
| 61 | <u>V</u> | 62 | 22 | 9 | 7 | 0 | 1.06 | 1.11 | 534 | 820 | 0.65 | <u>15683</u> | X | Comparative Example |
| 62 | <u>A</u> | 49 | 20 | 20 | 11 | 0 | 1.04 | 1.08 | 544 | 810 | 0.67 | <u>19000</u> | ◎ | Example |
| 63 | W | 66 | 17 | 11 | 6 | 0 | 1.05 | 1.1 | 656 | 844 | 0.78 | 17165 | ◎ | Example |
| 64 | X | 61 | 23 | 9 | 7 | 0 | 1.04 | 1.11 | 569 | 865 | 0.66 | 17985 | ◎ | Example |
| 65 | Y | 64 | 20 | 10 | 6 | 0 | 1.08 | 1.08 | 543 | 874 | 0.62 | 16998 | ◎ | Example |
| 66 | Z | 56 | 22 | 14 | 8 | 0 | 1.04 | 1.14 | 549 | 834 | 0.66 | 17106 | ◎ | Example |
| 67 | AA | 61 | 20 | 10 | 9 | 0 | 1.09 | 1.09 | 531 | 864 | 0.61 | 16945 | ◎ | Example |
| 68 | AB | 66 | 19 | 8 | 7 | 0 | 1.07 | 1.12 | 545 | 844 | 0.65 | 18115 | ◎ | Example |
| 69 | AC | 68 | 13 | 11 | 8 | 0 | 1.08 | 1.1 | 556 | 869 | 0.64 | 17658 | ◎ | Example |
| 70 | AD | 59 | 24 | 8 | 9 | 0 | 1.06 | 1.09 | 617 | 899 | 0.69 | 16555 | ◎ | Example |
| 71 | AE | 57 | 21 | 15 | 7 | 0 | 1.05 | 1.11 | 594 | 838 | 0.71 | 16954 | ◎ | Example |

Underlines indicate outside the range according to the present disclosure.
α: area ratio of ferrite, M: area ratio of martensite, B: area ratio of bainite Retained γ: area ratio of retained austenite, Other: area ratio of other metallic phase As is clear from Tables 1 and 3, each steel sheet having the predetermined chemical composition and area ratio of each phase, having the Mn concentration distribution limited to the predetermined level or less, and having the predetermined high TS×El value exhibited excellent workability while ensuring strength.

Moreover, as is clear from Tables 1 to 3, each steel sheet obtained as a result of using a steel slab having the predetermined chemical composition and appropriately controlling the hot rolling process, the cold rolling process, and the annealing process had the desired microstructure, Mn concentration distribution, and TS×El value and exhibited excellent workability.

A coated or plated layer was able to be favorably formed on the surface of such a steel sheet having excellent workability. The steel sheet having excellent workability can be suitably used in applications that require forming into complex shapes, such as automotive bodies.

The invention claimed is:

1. A steel sheet comprising:
   a chemical composition containing, in mass %,
   C: 0.08% or more and 0.16% or less,
   Si: 0.5% or more and 1.5% or less,
   Mn: 1.7% or more and 2.5% or less,
   P: 0.10% or less,
   S: 0.050% or less,
   Al: 0.01% or more and 0.20% or less, and
   N: 0.10% or less,
   with a balance consisting of Fe and inevitable impurities; and
   a steel microstructure in which, in area ratio to the entire steel microstructure, ferrite is 45% or more and 90% or less, martensite is 5% or more and 30% or less, bainite is 1% or more and 25% or less, retained austenite is 3% or more, and other metallic phase is 5% or less,
   wherein $[Mn]_M/[Mn]$ is 1.00 or more and 1.15 or less, and $[Mn]_M/[Mn]_F$ is 1.00 or more and 1.30 or less, where [Mn] is an average Mn concentration in steel, $[Mn]_M$ is an average Mn concentration in the martensite, and $[Mn]_F$ is an average Mn concentration in the ferrite, and
   a product of tensile strength and elongation is 16000 MPa·% or more.

2. The steel sheet according to claim 1, wherein the chemical composition further contains, in mass %, one or more selected from the group consisting of
   Nb: 0.040% or less,
   Ti: 0.030% or less,
   B: 0.0030% or less,
   Cr: 0.3% or less,
   Mo: 0.2% or less,
   V: 0.065% or less, and
   one or more selected from the group consisting of Ta, W, Ni, Cu, Sn, Sb, Ca, Mg, and Zr: 0.1% or less in total.

3. The steel sheet according to claim 2, wherein a yield ratio calculated as a ratio of yield stress to the tensile strength is 0.80 or less.

4. The steel sheet according to claim 2, further comprising a coated or plated layer on at least one side thereof.

5. The steel sheet according to claim 3, further comprising a coated or plated layer on at least one side thereof.

6. The steel sheet according to claim 1, wherein a yield ratio calculated as a ratio of yield stress to the tensile strength is 0.80 or less.

7. The steel sheet according to claim 6, further comprising a coated or plated layer on at least one side thereof.

8. The steel sheet according to claim 1, further comprising a coated or plated layer on at least one side thereof.

* * * * *